United States Patent [19]
Sonderegger et al.

[11] Patent Number: 5,329,823
[45] Date of Patent: Jul. 19, 1994

[54] INTERPOSED FORCE SENSOR INCLUDING AMPLIFIERS

[75] Inventors: Hans Sonderegger, Neftenbach; Mario Giorgetta, Winterthur; Peter Wolfer, Kleinandelfingen, all of Switzerland

[73] Assignee: Kistler Instrumente AG, Winterthur, Switzerland

[21] Appl. No.: 708,908

[22] Filed: May 31, 1991

[30] Foreign Application Priority Data

May 31, 1990 [CH] Switzerland ............... 01840/90

[51] Int. Cl.⁵ .................................... G01L 1/04
[52] U.S. Cl. ........................... 73/862.642; 73/862.68; 73/774
[58] Field of Search ............. 73/862.043, 862.635, 73/862.625, 862.042, 862.68, 862.637, 774

[56] References Cited

U.S. PATENT DOCUMENTS

| | | |
|---|---|---|
| 3,151,258 | 9/1964 | Sonderegger et al. ..... 73/DIG. 4 X |
| 3,210,993 | 10/1965 | Shoor et al. .................... 73/862.625 |
| 3,614,488 | 10/1971 | Sonderegger .................... 310/8.6 |
| 4,092,856 | 6/1978 | Kanda .................... 73/862.635 X |
| 4,425,808 | 1/1984 | Rand .................... 73/862.635 X |
| 4,802,371 | 2/1989 | Calderara et al. ............. 73/862.043 |

FOREIGN PATENT DOCUMENTS 3440670 10/1986 Fed. Rep. of Germany .

Primary Examiner—Richard E. Chilcot, Jr.
Assistant Examiner—Elizabeth L. Dougherty
Attorney, Agent, or Firm—Barnes & Thornburg

[57] ABSTRACT

An interposed sensor having a housing whose lateral extend is not greater than the lateral extend of the machine parts is to be installed between and having a plurality of measuring elements welded under preloading to the housing. Electronics including charge amplifiers are integral with the housing, either interior the lateral extend or in an annular compartment.

17 Claims, 4 Drawing Sheets ns,823

INTERPOSED FORCE SENSOR INCLUDING AMPLIFIERS

BACKGROUND AND SUMMARY OF THE INVENTION

The present invention relates to interposed sensors having measuring elements paralleled forcewise, which are fitted in machine parts transmitting force and moment. A principal requirement for such sensors is that they should take the form of disks or plates as thin as possible, so that they alter the installation conditions as little as possible.

The chief requirement for arrangements of this kind is that the subdivision of the total force transmitted through the plate into a smaller measuring force to the force sensors and a supplementary force bypassed must be constant in time.

A sensor of this kind is shown in DE 34 40 670 C2. Glued in these measuring plates are commercial force measuring elements. Their very critical overall heights compared with the measuring plate surface must be adjusted exactly to within a few microns of adapter plates and thrust washers. One consequence of this series connection of a number of disks, of which there are usually already five in the commercial force measuring elements, is great uncertainty in the force transmission by paralleling these elements. This is because eight disks connected in series, for example, with the contact surfaces have ten air gap layers, which according to their preloading have different elasticity ratios.

As a result, the individual force measuring elements in a measuring plate of this kind will give different force signals on account of the ten air gaps, because the size of these gaps is difficult to control. Moreover owing to the fitting of commercial force measuring elements and the necessary adapter and thrust washers, the plate thickness cannot be reduced below a minimum of 10 to 12 mm.

The purpose of the invention is to provide force measuring elements and measuring plates with significantly fewer air gaps in the force measuring arrangement, requiring no additional adapter plates and thrust washers, and being much thinner. This object is attained by the measuring elements consisting of disks having not more than five air gap layers including the force introduction surfaces, whereby the measuring elements are welded in under high mechanical preload, by the sensor surface being ground to ensure flatness, and by the measuring elements forming an assembly unit together with the charge amplifier arrangement. With this combination according to the invention, new installation and monitoring are possible at economical costs, with unified and constant signal conditions of the individual force measuring elements.

The invention relates primarily to piezoelectric force measuring arrangements operating together with charge amplifiers. Quartz ($SiO_2$) is usually employed as piezo material, allowing measurements lasting up to 15 minutes with only 1 to 2% signal loss, so that satisfactory static calibration is possible. The use of piezoceramics may be advisable in certain cases where stronger signals are needed and quasistatic measuring is not important. Nevertheless because quartz plates can be loaded both in compression and shear, depending on the crystal cut, quartz has proved to be the ideal material for multicomponent dynamometry.

The invention can, however, make use of other known sensor techniques. Thus the application of thin and thick film processes and possibly capacitive principles also is conceivable. However, only piezoelectrics makes possible the necessary rigidity against a solid metal plate arranged in parallel.

Other objects, advantages and novel features of the present invention will become apparent from the following detailed description of the invention when considered in conjunction with the accompanying drawings.

DETAILED DESCRIPTION OF THE DRAWINGS

Figure 1:
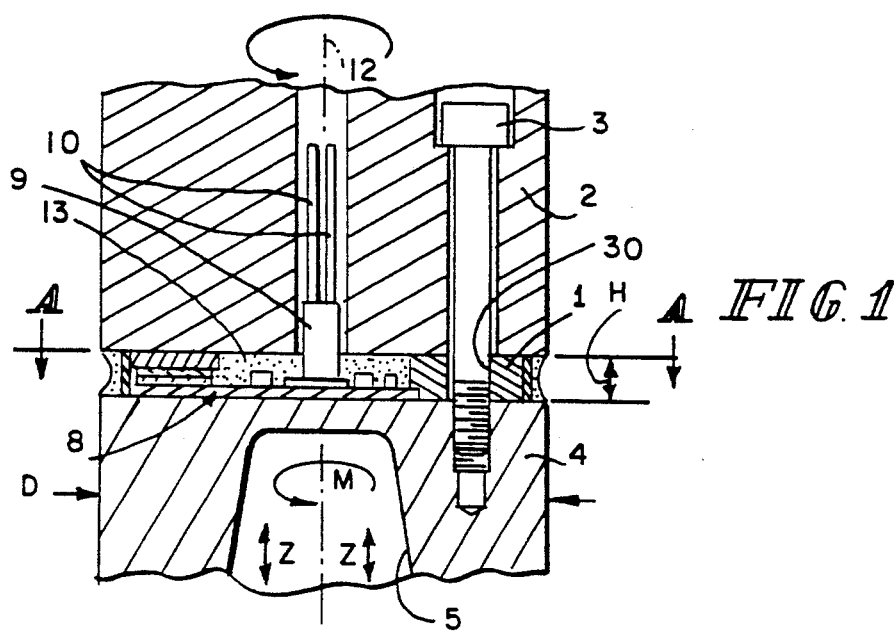
FIG. 1 is a cross-sectional view of an installed disk-shaped interposed plate sensor with charge amplifier arrangement in the bore of the disk.

FIG. 1 shows an interposed sensor according to the invention having an annular form 1, built into a driving shaft of a boring machine for example. Measurement of the axial force Z and driving moment M is required. Other force components may also be selected and will be described later. Between driving shaft 2 and tool carrier shaft 4 is the interposed sensor 1, preloaded with screws 3 so that the force transmission corresponds nearly to that of a solid steel disk. To avoid altering the installation conditions on the machine as little as possible, the thickness H of the interposed sensor 1 is as small as possible, typically about 1/10th of D of the sensor or a few mm.

Figure 4:
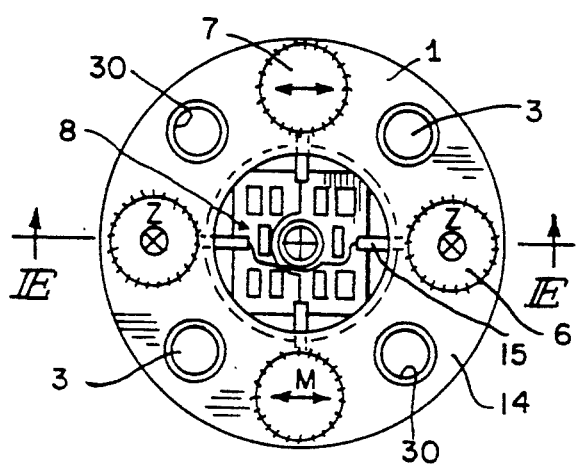
FIG. 4 is a cross-sectional view taken along lines A—A of FIG. 1.

In FIG. 4, the interposed sensor 1 consists of a metal disk 14 in which at least one disk-shaped measuring element 6 is fitted, though usually a number of disk-shaped measuring elements 6, 7 are spaced around the circumference.

Depending on the crystal cut, the measuring elements 6, 7 consist of pressure or Z force elements 6, or shear force elements 7, so that Z, X or Y forces or M moments can be measured, according to the orientation of the sensitivity axes of the crystals. Fitted in the bore of the disk 14 is an amplifier 8, to which the signal electrodes 15 of the measuring elements 6, 7 are connected. As shown in FIG. 1, a central connection sleeve 9 surrounds the power lines and signal lines 10, which lead in the cable channel 12 to the signal transmission not shown.

Figure 2:
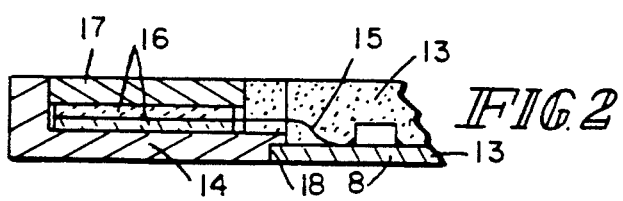
FIG. 2 is a cross-sectional view taken along line E—E of FIG. 4.
Figure 8:
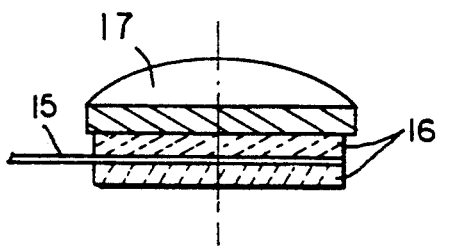
FIG. 8 is a cross-sectional view of a second measuring element.

FIG. 2 shows a detail of section E—E of FIG. 4. With this embodiment, the metal disk 14 has a blind hole in which a measuring element, as in FIG. 8, is fitted. The charge amplifier 8 is held in a groove 18 on the metal annulus 14. The signal electrode 15 between the crystal disks 16 leads to the corresponding connecting point 19 on the charge amplifier 8 directly without intervening wires or cables.

Figure 3:
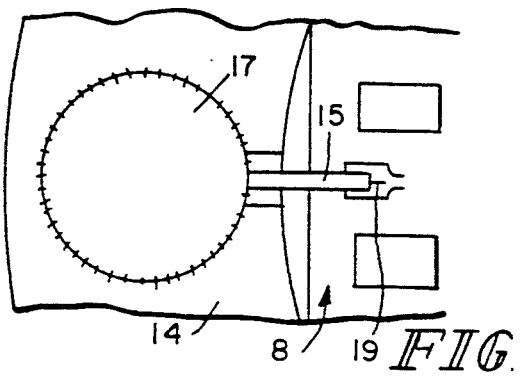
FIG. 3 is a plan of FIG. 2.

FIG. 3 shows the plan to FIG. 2. The metal annulus 14 is welded to the metal cover disk 17 of the sensor measuring element.

As already stated, FIG. 4 shows the assembled unit consisting of the metal annulus 14 and the built in charge amplifier 8, on which the signal electrodes 15 are connected directly. The entire arrangement is sealed airtight with a sealing compound 13, making it easy to fit because no highly insulating lines or connections have to be provided. The user is quite capable of fitting the highly insulating sensor himself. However, the charge amplifier 8 may also be connected in a different way. Preload bolts 3 may be led straight through openings 30 in the metal annulus 14 as illustrated in FIG. 1.

Figure 5:
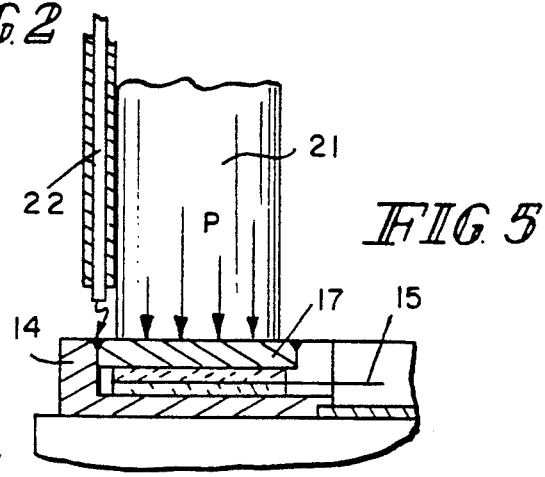
FIG. 5 is a cross-sectional view of a welding rig for the measuring element.

FIG. 5 shows in a detail how the measuring cell of FIG. 8 is welded into the metal annulus 14. The measuring element 15, 16, 17 is placed under high mechanical load by a pressing ram 21, after which it is welded to the annulus 14 by a laser welding fiber 22. Other welding techniques may also be used.

Figure 6:
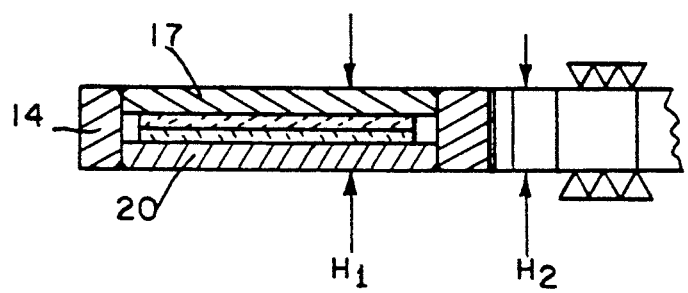
FIG. 6 is a cross-sectional view of another embodiment of FIG. 2.
Figure 7:
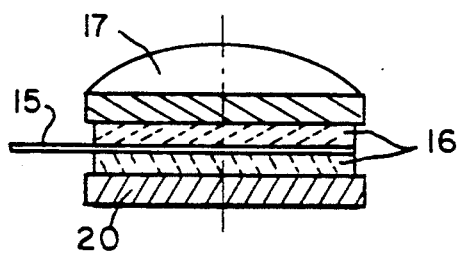
FIG. 7 is a cross-sectional view of a first measuring element.

In FIGS. 6 and 7, the cover disk 17 and bottom cover disk 20 are slightly oversized compared to the disk 16. After welding in, both surfaces are ground over or lapped flat to vvv finish on a two-wheel lapping machine to have a common planar surface.

Because the cover disks are of the same material as the metal annulus 14, the dimensions H1 and H2 of the annulus 14 are absolutely equal, i.e. the grinding or lapping operations on the annulus 14 and on the metal cover disks 17 remove exactly the same thickness of material.

FIG. 7 shows a measuring element for through hole. This embodiment is used in FIG. 6.

FIG. 8 shows a measuring element for a blind hole. This embodiment is used in FIG. 2. Usually two crystal or ceramic disks 16 are provided, with the signal electrode 15 between them. An arrangement with only one piezo disk is also possible. The signal electrode then lies between an insulating disk and the piezo disk.

Either pressure or shear crystals may be used for both measuring element types. Crystal and metal parts of the measuring elements in FIGS. 7 and 8 are fused into an assembled unit, ensuring minimal gap effect and simple fitting. Gluing may also be used.

Whether the metal annulus 14 has a through hole as in FIG. 6 or a blind hole as in FIG. 2, or whether only one piezo disk is used, is a design choice. Every possibility follows the same main principle.

Important according to the invention is that the measuring elements 6, 7 are welded in under high mechanical preload. After this, they are ground or lapped on one or both sides, depending on whether elements according to FIG. 7 or FIG. 8 are used. In this way and using fused or glued measuring elements, it is possible to attain the objective of reducing the multiple gap effect. Reliable measuring results may be expected over a long period from such measuring elements.

Figure 9:
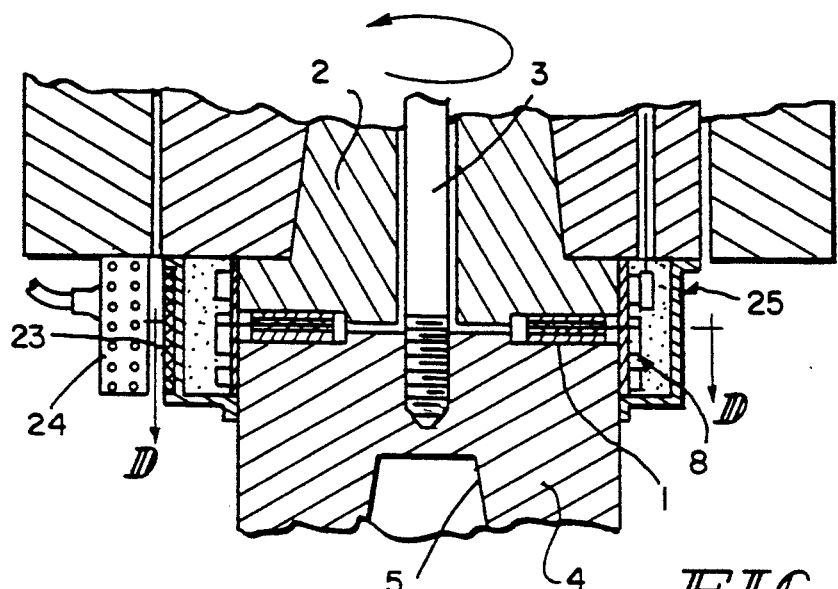
FIG. 9 is a cross-sectional view of an installation arrangement for measuring four components with torque.
Figure 10:
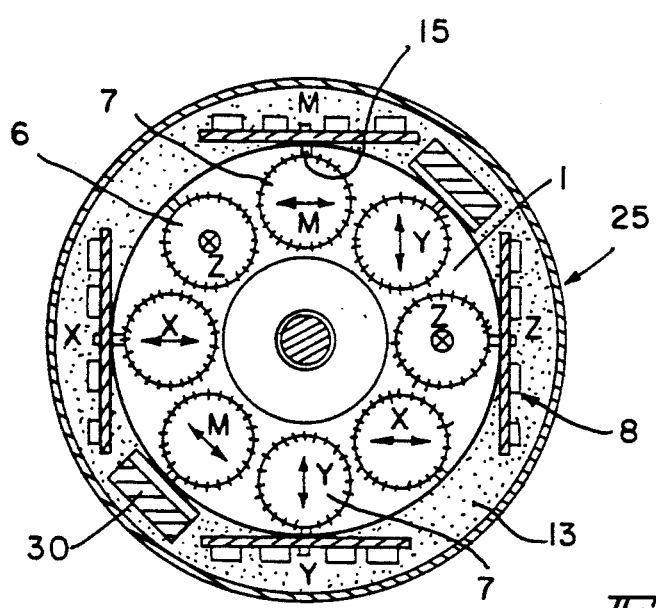
FIG. 10 is a cross-sectional view taken along lines D-D of FIG. 9.

FIGS. 9 and 10 show a complete application example of an interposed sensor with integrated amplifier electronics and digital inductive signal pick off. Of course, other wireless transmission means may be employed also.

The interposed sensor 1 is clamped by preload bolt 3 between driving shaft 2 and tool carrier shaft 4. For example both the force components X, Y, Z and the drive moments M are transmitted to the interposed sensor 1. For each of the four measured values, two symmetrically disposed measuring elements are provided, making altogether two for compressive forces Z and six for shear forces and moments X, Y and M. Accordingly, four charge amplifiers 8 are needed. They are arranged tangentially and mounted and sealed in the annular electronics housing 25.

This electronics housing 25 may be equipped with the rotating signal induction coil 23 and other transmission electronics parts. The stationary signal induction coil 24 is mounted on the machine guideway and contains the voltage supply as well as the signal pick off. However it is also possible to provide the signal pick off and voltage supply for the charge amplifiers 8 centrally at the end of the driving shaft 2 by means of a special transmission unit.

According to the invention, the charge amplifiers 8 are arranged so that the signal electrodes 15 can be connected straight to the ceramic plates of the amplifiers 8. However, other interesting connections are possible as well.

Figure 11:
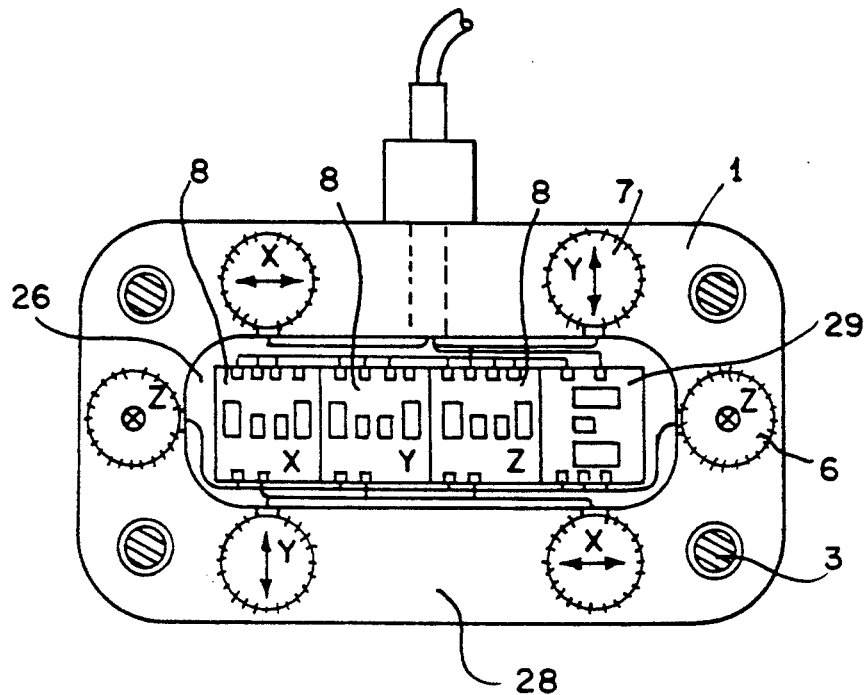
FIG. 11 is a plan view of a rectangular interposed plate sensor with built in amplifier arrangement.

FIG. 11 shows a rectangular interposed sensor 1 with the charge amplifiers 8 placed inside the force contact surface.

Figure 12:
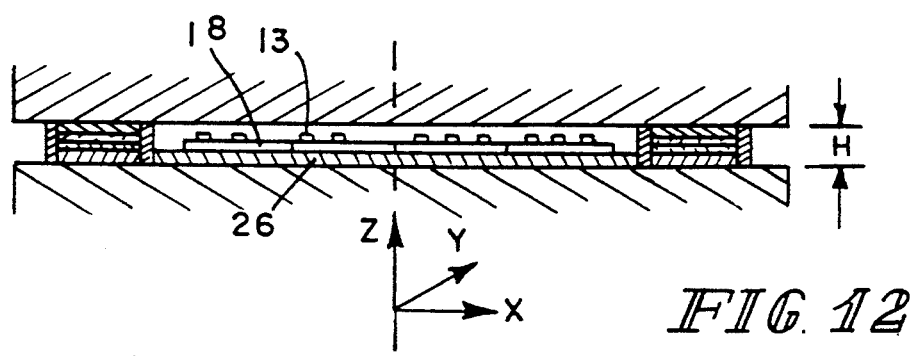
FIG. 12 is a cross-sectional view of FIG. 11 installed.

The example according to the invention in FIGS. 11 and 12 shows six measuring elements, two each for the space coordinates X, Y and Z. Again according to the invention, the measuring elements 7 are welded into the metal plate 28 under high mechanical pressing (shown in FIG. 5). The plate 28 is then ground and lapped on both sides.

For certain applications it may be advantageous to load some measuring elements more than others, especially if small changes of force are to be measured.

Figure 13:
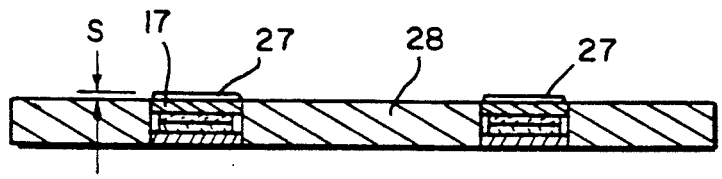
FIG. 13 is a cross-sectional view with metal layers vapor deposited on the measuring elements.

In such cases, either with a stencil or by photolithography the cover disk 17 of measuring elements 6, 7 is given a vapor-deposited layer 27 of thickness 'S' as illustrated in FIG. 13. The thickness is exactly a function of the deposition time. The layer 27 is of a hard material such as metal. In this way, on the basis of the ground and lapped overall surface, very accurately defined additional stresses can be set up in the measuring elements 6, 7, without requiring extra disks or films, which would introduce further air gap effects into the measuring elements.

A power pack 29 is connected to advantage before the three charge amplifiers 8 (−X, −Y, −Z). It may be connected straight to the standardized 24 to 36 V network of the machine. Charge amplifiers and power pack may be hybrid types.

Sensors of any form may be chosen instead of disk-shaped, annular or rectangular interposed sensors. Such forms can be adapted to the design configuration of the machine.

The invention thus makes possible a new category of interposed sensors, which are especially suited for measuring and especially monitoring cutting forces, riveting forces and welding forces on machine tools and robots. Machines having such monitoring sensors are capable of operating fully automatically. Piezoelectric metrology is eminently suited for multicomponent dynamometry. Disadvantages are that it measures quasistatically, and that highly insulating cables are needed between sensor and charge amplifier. Thanks to newly developed charge amplifiers which are factors smaller than prior commercial ones, it has become possible according to the invention to combine piezoelectric sensors and charge amplifiers into one unit, so that no connecting cables are now needed. With that, the quasistatic measuring capability using quartz as piezo material has been improved decisively.

Measurements on such combinations have revealed that a jump signal of 10% FS (full scale) produces less than 2% drift after 5 minutes force exposure.

Since in machining operations 95% of the working cycles last less than 5 minutes, a wide application scope has been opened up in industrial metrology by this sensor technique according to the invention.

By virtue of the very low height H of typically 6 to 8 mm, the interposed sensors according to the invention are easily fitted and are adaptable to the geometric requirements of the machine in simple fashion. Furthermore, they alter its stability structure only imperceptibly. The use of standardized disk measuring elements 6, 7 and welding these in under high mechanical pressure, also the avoidance of air gaps connected in series and the possibility of directly connecting the measuring elements to charge amplifiers while avoiding cable connections, yields an interposed sensor concept opening up new possibilities in machining technology and robotics.

What is claimed is:

1. An interposed sensor to be fitted between two force-transmitting machine parts having a first lateral extent comprising:
   an annular housing:
   one or more measuring elements each having at least two but not more than five layers and including force introduction surfaces forming gaps there between;
   weld means including a weld for securing said measuring element under mechanical preloading into said housing sufficient to reduce said gaps;
   said measuring elements, weld and housing having a common planar surface; and
   electronics including one or more charge amplifiers in an annular compartment integral to said housing and tangentially outside said housing such that the lateral extent of said housing and said electronics is not greater than said first lateral extent.

2. Interposed sensor according to claim 1 including a through hole in said housing for receiving a preloading bolt interconnecting said two force-transmitting machine parts.

3. Interposed sensor according to claim 1, wherein the measuring elements include quartz discs cut in various directions, and signal electrodes connected to said charge amplifiers without cables.

4. Interposed sensor according to claim 1, wherein the measuring elements include piezo-ceramic disks with various orientations, and signal electrodes connected to said charge amplifiers without cables.

5. Interposed sensor according to claim 1 wherein said electronics includes transmission electronics in said annular compartment and means for supplying energy and transmitting signals contact-free to a telemetering system.

6. Interposed sensor according to claim 1 wherein said measuring elements include a vapor deposited layer on said common planar surface of a certain thickness to increase the proportion of the force conducted to the measuring elements compared to the housing.

7. Interposed sensor according to claim 1 wherein the measuring elements detect three axes of forces and torques.

8. Interposed sensor according to claim 1 wherein the measuring elements include two crystal disks and a signal electrode located between them and means for joining said disks and said electrode with at least one metal cover disk to form a preassembled unit having reduced internal gaps.

9. Interposed sensor according to claim 1 wherein said measuring elements include a piezoelectric disk and an insulating disk with electrode between them.

10. An interposed sensor to be fitted between two force-transmitting machine parts having a first lateral extent comprising:
    a housing having a lateral extent not greater than said first lateral extent, a plurality of holes around the periphery of said housing, at least one through hole and a hole in the center of said housing;
    one or more measuring elements secured in said holes around the periphery of said housing;
    said measuring elements and housing having a common planar surface;
    said at least one through hole in said housing receiving a preloading bolt interconnecting said two force-transmitting machine parts; and
    electronics including one or more charge amplifiers secured in said hole in the center of said housing.

11. Interposed sensor according to claim 10 wherein said housing has an annular form and said charge amplifiers are in the bore of the annulus; and including lines coaxial to said bore connected to said electronics.

12. Interposed sensor according to claim 11 including an insulator in said bore and over said electronics and having a surface in said common planar surface.

13. Interposed sensor according to claim 10, wherein said housing has an annular form with the electronics including a power pack and the charge amplifier inside the bore of the annulus.

14. Interposed sensor according to claim 10 wherein said housing has a rectangular form and said electronics include a power pack and said charge amplifiers placed inside a flange on a distribution plate of said housing and means for sealing said distribution plate with said interposed sensors to form an assembly unit.

15. Interposed sensor according to claim 10 wherein the measuring elements are secured by a weld in through holes in said housing matched to the measuring elements.

16. Interposed sensor according to claim 10 wherein the measuring elements are secured by a weld in blind holes in said housing.

17. An interposed sensor to be fitted between two force-transmitting machine parts having a first lateral extent comprising:
    a housing having a lateral extent not greater than said first lateral extent;
    a plurality of measuring elements including signal electrodes and secured in holes of said housing;
    said measuring elements and housing having a common planar surface;
    at least one through hole in said housing for receiving a preloading bolt interconnecting said two force-transmitting machine parts; and
    electronics including charge amplifiers secured to said housing adjacent to said measuring elements and connected to said measuring element directly by said signal electrodes.

* * * * *